United States Patent [19]

Yokota et al.

[11] Patent Number: 5,412,513
[45] Date of Patent: May 2, 1995

[54] RECORDING/REPRODUCING APPARATUS

[75] Inventors: Junichi Yokota; Hiroshi Okada; Hiroshi Yoshioka, all of Kanagawa, Japan

[73] Assignee: Sony Corporation, Tokyo, Japan

[21] Appl. No.: 229,315

[22] Filed: Apr. 18, 1994

[30] Foreign Application Priority Data

Apr. 19, 1993 [JP] Japan .................. 5-091176

[51] Int. Cl.⁶ ............................ G11B 5/00; G11B 5/78
[52] U.S. Cl. ...................................... 360/32; 360/36.2
[58] Field of Search .................. 360/32, 36.2, 19.1, 360/10.1, 10.2, 10.3; 358/335, 310, 313, 320; 348/604, 500

[56] References Cited

U.S. PATENT DOCUMENTS

| | | | |
|---|---|---|---|
| 4,860,090 | 8/1989 | Murata et al. | 348/604 |
| 4,985,757 | 1/1991 | Yasuki et al. | 348/604 |
| 5,216,496 | 6/1993 | Miyamoto et al. | 358/310 X |
| 5,239,381 | 8/1993 | Takahashi | 358/339 |
| 5,291,469 | 3/1994 | Yoshinaka | 360/36.2 X |

FOREIGN PATENT DOCUMENTS 0483874  5/1992  European Pat. Off. ............ 358/335

OTHER PUBLICATIONS

Siegel et al., "Modulation & Code for Information Storage", IEEE Magazine, pp. 68–86, Dec. 1991.

Primary Examiner—Donald Hajec
Assistant Examiner—Thien Minh Le
Attorney, Agent, or Firm—William S. Frommer; Alvin Sinderbrand

[57] ABSTRACT

A recording/reproducing apparatus in which the number of revolutions of a recording head 14 is controlled depending on the frequency of the vertical synchronization signals for picture signals supplied from outside for digitally recording/reproducing picture data. It is not the recording head 14 but the playback head 16 whose number of revolutions is controlled in such manner during reproduction. In forming DRCK control signals employed for controlling the number of revolutions of the recording head, the frequency of the vertical synchronization signals for the picture signals supplied from outside is corrected so as to be within a range of offset of ±1% relative to the frequency of standard frequency vertical synchronization signals, and the DRCK control signals are formed based upon the vertical synchronization signals corrected in this manner. This permits picture data to be recorded so as to assure interchangeability between different apparatus of the same version, and makes it possible to improve the stability after phase capturing of, for example, a DRCKPLL circuit 34 designed to form the DRCK control signals.

4 Claims, 5 Drawing Sheets

RECORDING/REPRODUCING APPARATUS

BACKGROUND OF THE INVENTION

This invention relates to a recording/reproducing apparatus which may be used in, for example, a digital video tape recorder or a digital video camera.

There has hitherto been known a digital video tape recorder in which the frequency of vertical synchronization signals in the picture signals supplied from outside, such as component or composite signals, is detected and the number of revolutions of the rotary head is controlled depending on the detected frequency of the vertical synchronization signals for digital recording and analog reproduction of the picture signals.

Such digital video tape recorder is made up of an input/output processing section, a companding section, a recording/reproducing section and a controller for generating clocks of different frequencies and supplying the generated clocks to the respective sections.

Specifically, when recording the picture signals, the controller detects the vertical synchronization signals of the picture signals supplied from outside and, based upon the detected vertical synchronization signals, generates clocks of, for example, 13.5 Mhz, 18MHz and 43 Mhz. The controller routes the 13.5 Mhz clocks to the input/output section, while routing the 18 MHz clocks and the 43 MHz clocks to the companding section and the recording/reproducing section, respectively.

The input/output section converts the picture signals supplied from the outside source into corresponding digital signals, based upon the 13.5 MHz clocks, to generate picture data and generate luminance data and chroma data from the generated picture data, and transmits the luminance and chroma data to the companding unit.

The companding unit divides the luminance and chroma data into blocks, each having a pre-set number of pixels, based upon the 18 MHz clocks, and performs orthogonal transform on the block basis for carrying out the data compression. Picture data for one picture are generated from the compressed block-based luminance and chroma data and routed to the recording/reproducing unit.

The recording/reproducing unit encodes the picture data, based upon the 43 MHz clocks, and appends parity data. The resulting data is routed to a recording head as a rotary head.

The number of revolutions of the recording head is changed depending on the frequency of the vertical synchronization signals of the picture signals supplied from outside. The tape running speed, however, is not changed. The recording head is run in rotation with the thus changed number of revolutions for obliquely recording the picture data on a magnetic tape.

If the frequency of the vertical synchronization signals of the picture signals supplied from outside is the standard frequency, the recording tracks formed on the magnetic tape by obliquely recording the picture data thereon are as shown in FIG. 1a.

If the frequency of the vertical synchronization signals of the picture signals supplied from outside is higher than the standard frequency, the recording head is controlled so that its number of revolutions becomes higher than the standard number of revolutions, so that recording tracks TR having a slope more acute than that of the recording tracks TR for the picture signals having the standard frequency vertical synchronization signals are formed on the magnetic tape, as shown in FIG. 1b.

If the frequency of the vertical synchronization signals of the picture signals supplied from outside is lower than the standard frequency, the recording head is controlled so that its number of revolutions becomes lower than the standard number of revolutions, so that recording tracks TR having a slope flatter than that of the recording tracks TR for the picture signals having the standard frequency vertical synchronization signals are formed on the magnetic tape, as shown in FIG. 1c.

When reproducing the picture data, thus digitally recorded on the magnetic tape, the recording/reproducing unit controls the rotation of the playback head, as a rotary head, so that its number of revolutions is equal to the standard number of revolutions. By detecting the timings of Automatic track finding signals (ATF signals) generated on reproduction, and by applying a tracking servo, the playback head may be controlled to be at an on-track position for correctly reproducing the picture data.

When the picture data are reproduced in this manner, the recording/reproducing system performs time base correction and error correction on the reproduced data and routes the resulting data to the companding unit, based upon the 43 MHz clocks.

The companding unit divides the picture data into blocks, each having a pre-set number of pixels, based upon the 18 MHz clocks, and performs inverse orthogonal transform on the blocked data on the block basis, and routes the transformed data to the input/output processing unit.

The input/output processing unit generates picture data for one picture from the picture data, supplied on the block basis, based upon the 13.5 MHz clocks, and separates the picture data into luminance data and chroma data. These luminance data and chroma data are converted into corresponding analog luminance and chroma signals which are outputted via an output terminal to an outside device, such as a monitor device.

Thus the digital video tape recorder is responsive to the frequency of the vertical synchronization signals of the picture signals supplied from outside in order to control the number of revolutions of the recording head and the playback head so that the picture signals supplied from outside may be correctly recorded or reproduced even although the frequency of the vertical synchronization signals of the picture signals supplied from outside is different from the standard frequency.

However, with the above digital Video tape recorder, since the number of revolutions of the recording head is controlled responsive to the frequency of the vertical synchronization signals of the picture signals from the outside source for recording the picture signals, the slope of the recording tracks is more acute than a standard gradient if the frequency of the vertical synchronization signals is higher than a standard frequency, as shown in FIG. 1b, while becoming flatter than the standard gradient if the frequency of the vertical synchronization signals is lower than the standard frequency, as shown in FIG. 1c. The picture data recorded for the standard frequency of the vertical synchronization signals may be correctly reproduced by another digital video tape recorder not having the function of controlling the rotation of the recording/playback head. However, if the rotation of the recording head is controlled, for example, increased, in recording the picture data, the recorded data cannot be reproduced correctly by another digital tape recorder.

The above-described problem of interchangeability between different devices of the same version becomes more outstanding because the gradient of the recording tracks TR becomes more acute or flatter when the number of revolutions of the recording head becomes higher or lower than a standard value, respectively.

Also, with the above-described digital video tape recorder, since the number of revolutions of the recording head is changed depending on the frequency of the vertical synchronization signals, it has been necessary to increase the phase capture range of a phase-locked loop (recording PLL circuit) which is designed to maintain a constant number of revolutions of the recording head during the recording. The result is that the recording PLL circuit becomes unstable after phase capture so that fluctuations tend to be produced even when the frequency of the vertical synchronization signals of the picture signals supplied from out, side is the standard frequency.

On the other hand, since it is necessary to increase the phase capture width of the recording PLL circuit, it is necessary to correspondingly increase the phase capture width of a PLL circuit designed to generate the playback clocks to a value larger than the phase capture width of the recording PLL circuit, with the result that the playback PLL circuit is again lowered in stability after phase capture.

SUMMARY OF THE INVENTION

It is an object of the present invention to provide a recording/reproducing apparatus capable of correctly recording or reproducing the picture information.

It is another object of the present invention to provide a recording/reproducing apparatus capable of changing the number of revolutions of the rotary head of the recording/reproducing section in recording the picture information.

With the recording and/or reproducing apparatus according to the present invention, control means is provided for detecting the frequency of the vertical synchronization signals of the picture signals supplied from outside. If the frequency thus detected is within the pre-set range of offset, the vertical synchronization signals are directly used for forming the clocks for data processing means and the recording/reproducing section. If the frequency thus detected is not within the pre-set range of offset, the vertical synchronization signals are corrected so as to be within another pre-set range of offset and the vertical synchronization signals thus corrected are used for forming the clocks for data processing means and the recording/reproducing section. In this manner, there is no necessity of forcibly enlarging the capture width of a phase-locked loop (PLL) circuit adapted to form clocks for the data processing means and the recording/reproducing section with the result that the stability after phase capturing of the PLL circuit may be improved and clocks may be formed which are suited to correct recording of the picture information.

By performing rotational control of the rotary head using these clocks formed from the vertical synchronization signals corrected as described above, the picture information recorded by the recording and/or reproducing apparatus according to the present invention may be correctly reproduced by a different recording and/or reproducing apparatus not having the drum control function.

Specifically, by performing the rotational control of the rotary head using the above clocks, there is no necessity of enlarging the phase capture width of the PLL circuit, which is adapted to generate the clocks for rotationally controlling the rotary head, thus resulting in the improved stability after phase capture of the PLL circuit.

Further, the playback clocks are generated when the recorded picture information is reproduced, thus resulting in the improved stability after phase capture of the PLL circuit. In this manner, the picture information may be reproduced correctly.

DESCRIPTION OF THE PREFERRED EMBODIMENTS

Figure 1:
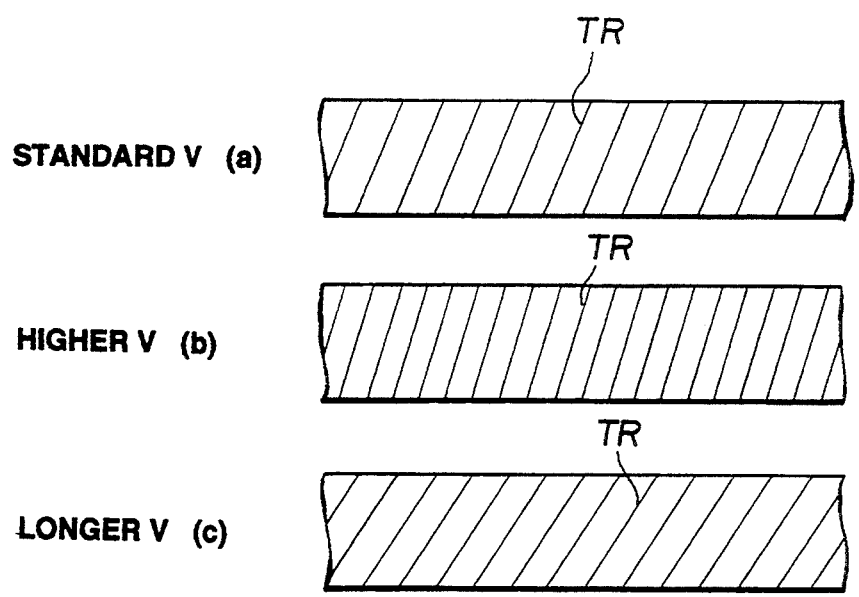
FIG. 1 is a schematic view for illustrating the slope of the recording tracks formed on the magnetic tape.
Figure 2:
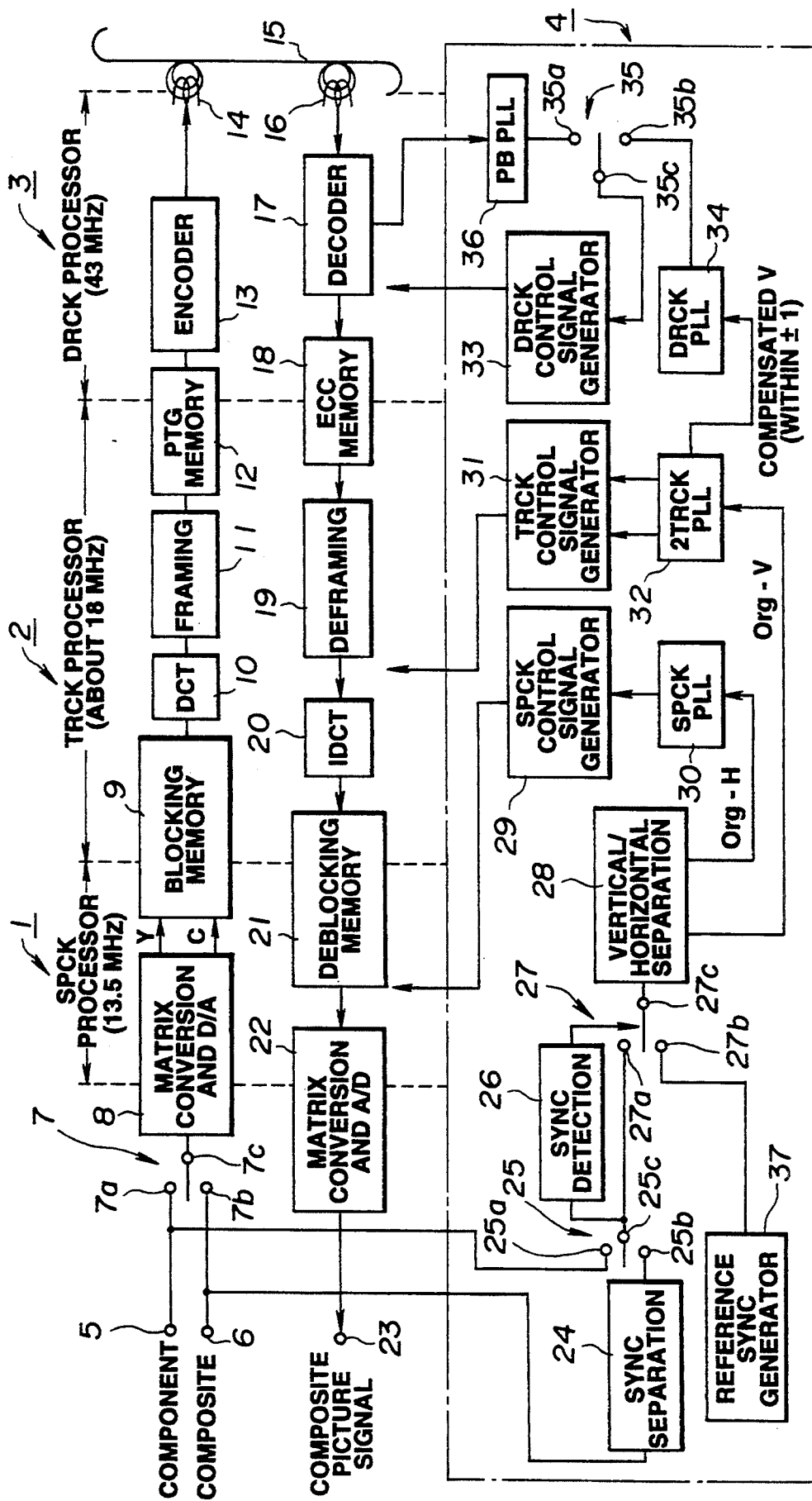
FIG. 2 is a block diagram showing a digital video tape recorder having the recording/reproducing apparatus of the present invention incorporated therein and provided with a drum controlling function.

The recording/reproducing apparatus according to the present invention may be applied to a digital video tape recorder having a so-called drum rotation control function in which the number of revolutions of the recording head is controlled based upon the frequency of the vertical synchronization signals of the picture signals supplied from outside in order to digitally record or reproduce the picture information, as shown for example in FIG. 2.

The digital video tape recorder includes an input/output processing section for picture signals, that is a sampling clock ((SPCK) processing section) 1, a companding unit for compressing and expanding the picture data, that is a transmission clock ((TRCK) processing section) 2, a recording/reproducing section for recording or reproducing the picture signals or digital recording clock ((DRCK) processing section) 3 and a controller 4 for forming clocks dedicated to the processing sections 1 to 3 for controlling the digital video tape recorder in its entirety.

For recording the signals supplied from an outside source, such as composite signals, with the above-described digital video tape recorder, these signals are supplied via an input terminal 6 shown in FIG. 2 to an input fixed contact 7b of a first changeover switch 7, while being supplied to a synchronization signal separating circuit 24 in the controller 4.

The first changeover switch 7 is controlled for selecting the input fixed contact 7b by a movable contact 7c. Thus the composite signals from the input terminal 6 are routed to an input picture signal processing circuit 8 via the changeover switch 7.

The synchronization signal separating circuit 24 extracts the synchronization signals from the composite signals to transmit the extracted signals to an input fixed terminal 25b of a second changeover switch 25.

Since the picture signals supplied from the outside source in this case are the composite signals, the second changeover switch 25 is controlled to select the input fixed contact 25b by a movable contact 25c. Thus the synchronization signals extracted by the synchronization signal separating circuit 24 are routed via the second changeover switch 25 to a synchronization detection circuit 26, while being supplied to an input fixed contact 27a of a third changeover switch 27.

The synchronization detection circuit 26 detects the synchronization signals and, when detecting the synchronization signals, controls the third changeover switch 27 for selecting the input fixed contact 27a by a movable contact 27c. Thus the synchronization signals from the synchronization signal separating circuit 24 are routed via the third changeover switch 27 to a vertical/horizontal separating circuit 28.

If the synchronization signals are not selected for a pre-set time interval, the synchronization detection circuit 26 controls the third changeover switch 27 for selecting the input fixed contact 27b by the movable contact 27c. Reference synchronization signals from a reference synchronization generator 37 are fed to the input fixed terminal 27b, so that the synchronization signals may be supplied to the vertical/horizontal separating circuit 28.

The above explanation refers to a case in which the composite signals are supplied from the outside source. If component signals are supplied from an outside source, these signals are supplied via an input terminal 5 to an input fixed contact 7a of the first changeover switch 7 and to an input fixed terminal 25a of the second changeover switch 25.

In this case, the changeover switch 7 is controlled for selecting the input fixed contact 7a by the movable contact 7c. Thus the component signals from the input terminal 5 are routed via the first changeover switch 7 to the input picture processing circuit 8.

On the other hand, the second changeover switch 25 is controlled for selecting the input fixed contact 25a by the movable contact 25c. Thus the component signals from the input terminal 5 are routed to the synchronization detection circuit 26 and to the input fixed contact 27a of the third changeover switch 27.

The synchronization detection circuit 26 detects the synchronization signals for the component signals and, when detecting the synchronization signals, controls the third changeover switch 27 for selecting the input fixed contact 27a by the movable contact 27c.

This causes the synchronization signals for the component signals to be supplied to the vertical/horizontal separating circuit 28.

If the synchronization signals are not selected for a pre-set time interval, the synchronization detection circuit 26 controls the third changeover switch 27 for selecting the input fixed contact 27b by the movable contact 27c.

In this manner, the reference synchronization signals from the reference synchronization generator 37 may be supplied to the vertical/horizontal separating circuit 28 even upon failure of detection of the synchronization signals for the component signals.

If the synchronization signals are supplied to the vertical/horizontal separating circuit 28, the circuit 28 separates the synchronization signals into vertical synchronization signals and horizontal synchronization signals, of which the horizontal synchronization signals are routed to a sampling clock PLL (SPCKPLL) circuit 30, which is a phase locked loop circuit (PLL circuit) for the SPCK processing section 1, and the vertical synchronization signals are routed to a 2TRCKPLL circuit 32, which is a PLL circuit for the TRCK processing section 2.

The SPCKPLL circuit 30 phase-captures the horizontal synchronization signals to form the horizontal synchronization signals of the correct timing to transmit the so-formed horizontal synchronization signals to a SPCK control signal generating circuit 29.

The SPCK control signal generating circuit 29 generates 13.5 MHz clocks, as recommended by Comite Consultatif International des Radio Communications (CCIR), with the horizontal synchronization signals as reference signals, while generating SPCK control signals, and transmitting these signals to the SPCK processing section 1.

In the SPCK processing section 1, the input picture signal processing circuit 8, fed with the composite signals, samples the composite signals by the 13.5 MHz clocks and digitizes the sampled signals in order to generate composite data. The input signal processing circuit 8 also generates luminance data (Y) and clock data (C) based upon the SPCK control signals and transmits these data to a blocking memory 9.

The blocking memory 9 is fed with the 13.5 MHz clocks. The above-mentioned luminance data and the chroma data are written in the blocking memory 9 by the 13.5 MHz clocks.

Figure 3:
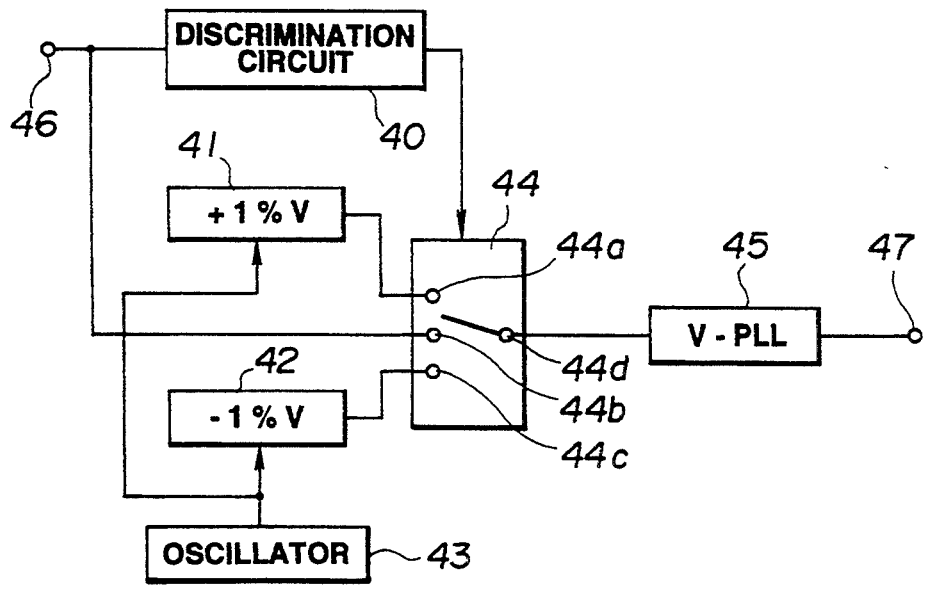
FIG. 3 is a block diagram showing essential parts of a 2TRCKPLL circuit 3 provided in a digital video tape recorder shown in FIG. 1.

FIG. 3 shows essential parts of the 2TRCKPLL circuit 32 in which the vertical synchronization signals from the vertical/horizontal separating circuit 28 are routed via an input terminal 46 to a discrimination circuit 40 an input fixed contact 44b of a changeover switch 44.

An oscillator 43 is oscillated at the frequency of the standard vertical synchronization signals and transmits oscillation signals to a first oscillator 41 and a second oscillator 42.

The first oscillator 41 forms vertical synchronization signals having the frequency higher by 1% than the standard vertical synchronization signals, based upon oscillation signals from the oscillator 43, and transmits the so-formed vertical synchronization signals to an input fixed terminal 44a of the changeover switch 44.

The second oscillator 42 forms vertical synchronization signals having the frequency lower by 1% than the standard vertical synchronization signals, based upon oscillation signals from the oscillator 43, and transmits the so-formed vertical synchronization signals to an input fixed terminal 44c of the changeover switch 44.

The discrimination circuit 40 detects the frequency of the vertical synchronization signals, while also detecting by which percent the frequency of the vertical synchronization signals is deviated with respect to the vertical synchronization signals of the standard frequency. If the frequency deviation is not more than ±1%, the changeover switch 44 is controlled for selecting the input fixed contact 44b by the movable contact 44d.

This causes the vertical synchronization signals from the input terminal 46 to be directly supplied via the changeover switch 44 to a V-PLL circuit 45.

If the frequency deviation is more than +1%, the changeover switch 44 is controlled for selecting the input fixed contact 44a by the movable contact 44d.

In this manner, the vertical synchronization signals having the frequency higher by 1% than that of the standard frequency are supplied via the changeover switch 44 to the V-PLL circuit 45.

If the frequency deviation is more than −1%, the changeover switch 44 is controlled for selecting the input fixed contact 44c by the movable contact 44d.

In this manner, the vertical synchronization signals having the frequency lower by 1% than that of the standard frequency are supplied via the changeover switch 44 to the V-PLL circuit 45.

The V-PLL circuit 45 phase-captures the respective vertical synchronization signals and outputs the vertical synchronization signals of the correct timing at an output terminal 47.

Figure 4:
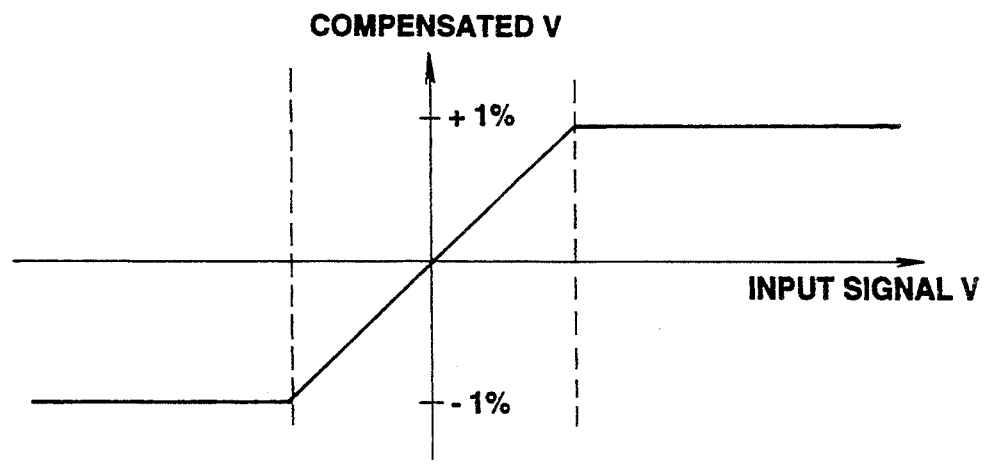
FIG. 4 is a graph for illustrating output characteristics of the 2TRCKPLL circuit 3.

The 2TRCKPLL circuit 32 corrects the frequency of the vertical synchronization signals of the picture signals supplied from outside so that the frequency deviation will be not more than ±1% with respect to the standard frequency, as shown in FIG. 4. The 2TRCKPLL circuit 32 transmits the corrected vertical synchronization signals to the DRCKPLL circuit 34 shown in FIG. 2, while forming clocks of approximately 36 MHz and clocks of approximately 18 MHz, obtained by dividing the clock frequency of 36 MHz by two, based upon the corrected vertical synchronization signals. These 36 and 18 MHz clocks are transmitted to the TRCK control signal generating circuit 31.

The TRCK control signal generating circuit 31 transmits the 18 MHz clocks to the TRCK processing unit 2, while generating TRCK signals based upon the 18 MHz clocks and 36 MHZ clocks. These TRCK control signals are routed to the TRCK processing section 2.

In the TRCK processing section 2, the luminance data and the chroma data, written in the blocking memory 9 with the 13.5 MHz clocks, are read out with the 18 MHz clocks and routed to an orthogonal transform (DCT) circuit 10.

The DCT circuit 10 divides the luminance data and the chroma data into blocks of 8×8 pixels, based upon the TRCK control signals, and performs an orthogonal transformation on the blocked data for data compression. The compressed block-based luminance and chroma data are supplied to a framing circuit 11.

The framing circuit (frame-forming circuit) 11 forms picture data for one picture from the compressed luminance and chroma data based upon the TRCK control signals and transmits the picture data to a parity-generating (PTG) memory 12.

The PTG memory 12 is fed with the 18 MHz clocks. The picture data are written by the 18 MHz clocks in the PTG memory 12 and parity data is appended to the picture data.

The DRCKPLL circuit 34, fed with the vertical synchronization signals from the 2TRCKPLL circuit 32, phase-captures the vertical synchronization signals and generates clocks of approximately 43 MHz of the correct timing which are routed to the input fixed contact 35b of the fourth changeover switch 35.

Thus the frequency of the vertical synchronization signals supplied to the DRCKPLL circuit 34 is controlled by the 2TRCKPLL circuit 32 so that the frequency deviation is not more than ±1% with respect to the frequency of the standard vertical synchronization signals. Thus there is no necessity of enlarging the phase capture width of the DRCKPLL circuit 34, so that the operation after phase capture may be improved in stability.

During the recording, the fourth changeover switch 35 is controlled to select the input fixed contact 35b by the movable contact 35c. Consequently, the 43 MHz clocks from the DRCKPLL circuit 34 are supplied via the fourth changeover switch 35 to a DRCK control signal generating circuit 33.

The DRCK signal generating circuit 33 transmits the 43 MHz clocks to the DRCK processing circuit 3 and forms DRCK control signals from the 43 MHz clocks to transmit the resulting DRCK control signals to the DRCK processing section 3.

In the DRCK processing section 3, the picture data written in the PTG memory 12 are read out by the 43 MHz clocks supplied from the DRCK control signal generating circuit 33 and are transmitted to an encoder 13.

The encoder 13 encodes the picture data in a pre-set manner based upon the DRCK control signals and transmits the encoded data to a recording head 14 designed as a rotary head.

The recording head 14 causes the picture data to be obliquely recorded on the magnetic tape 15 with the number of revolutions as controlled by the DRCK control signals. In this manner, even if the frequency of the vertical synchronization signals supplied from outside differs from the standard frequency, the picture signals may be recorded in accordance with the frequency different from the standard frequency so that correct recording may be made in accordance with the picture signals supplied from the outside source.

In addition, since the DRCK control signals are formed based upon the vertical synchronization signals controlled to have frequency deviation not more than ±1% with respect to the frequency of the standard vertical synchronization signals, it suffices to control the number of revolutions of the recording head 14 so as to be within ±1% of the standard number of revolutions. Thus the tilt of the recording tracks formed on the magnetic tape 15 may be comprised within a range such that the recording data recorded in the recording tracks may be correctly reproduced by the playback head having the standard number of revolutions. Consequently, if the picture signals recorded by the digital video tape recorder of the present embodiment are reproduced by a digital video tape recorder not having such drum rotation control function, the picture signals may be reproduced correctly. In other words, it is possible to improve interchangeability between different recording/reproducing apparatus of the same version.

The picture data recorded in this manner is reproduced during playback by a playback head 16 designed as a rotary head and supplied to the decoder 17.

The decoder 17 decodes the picture data in a pre-set manner and transmits the decoded data to an ECC memory 18 and to a playback PLL (PBPLL circuit) 36.

The PBPLL circuit 36 phase-captures the picture data and generates playback clocks of the correct timing which are routed to an input fixed contact 35a of the fourth changeover switch 35. For playback, the fourth changeover switch 35 is controlled to select an input fixed contact 35a by the movable contact 35c, so that the playback clocks from the PBPLL circuit 36 are routed via the fourth changeover switch 35 to the DRCK control signal generating circuit 33.

The DRCKPLL circuit 34 generates clocks of approximately 43 MHz for the picture data and DRCK control signals having the frequency conforming to the picture data and transmits the generated signals to the DRCK processing section 3.

By detecting the timing of the ATF signals produced by reproduction, the number of revolutions of the playback head 16 may be controlled to be equal to that of the recording head 14 during the recording to permit the recording tracks to be traced correctly by the playback head 16 in order to correctly reproduce the picture data.

On the other hand, since the picture data recorded on the magnetic tape 15 are recorded on the recording head 14, the number of revolutions of which is controlled to be within ±1% of the usual number of revolutions, as described above, the phase capture range of the PBPLL circuit 36 need not unnecessarily be increased, thereby improving the stability of the operation after phase capture of the PBPLL circuit 36.

The picture data supplied to the ECC memory 18 is written in the ECC memory 18 by the 43 MHz clocks for error correction.

For playback, the third changeover switch 27 is controlled to select the input fixed contact 27b by the movable contact 27c. This permits the TRCK control signal generating circuit 31 to generate the TRCK control signals and the 18 MHz clocks based upon the vertical synchronization signals from the reference synchronization generator 37 in order to generate the SPCK control signals and the 13.5 MHz clocks.

The picture data written in the ECC memory 18 are read by the 18 MHz clocks from the TRCK control signal generating circuit 31 for each of, for example, 8×8 pixels, so as to be supplied to the inverse orthogonal transform circuit 20.

The inverse orthogonal transform circuit 20 performs inverse orthogonal transform on the block-based picture data (luminance data and chroma data) for expanding the picture data. The expanded picture data are supplied to a de-blocking memory 21.

The picture data supplied to the de-blocking memory 21 are written therein by the 18 MHz clocks for forming picture data for one picture. The picture data written in the de-blocking memory 21 are read by the 13.5 MHz clocks and supplied to an output picture signal processing circuit 22.

The output picture signal processing circuit 22 forms the composite data, supplied thereto in the form divided into the luminance data and the chroma data, based upon the SPCK control signals from the SPCK control signal generating circuit 29, while also forming the composite signals by converting the composite signals into corresponding analog data with the aid of the 13.5 MHz clocks. The resulting composite signals are outputted at an output terminal 23.

Figure 5:
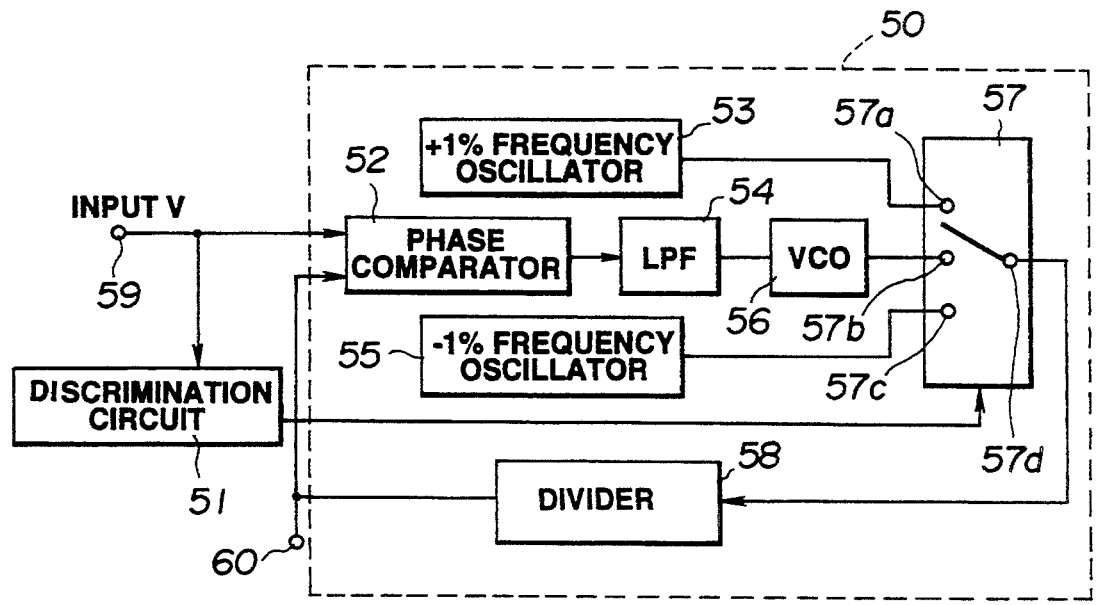
FIG. 5 is a block diagram showing a modification of the 2TRCKPLL circuit 3.
Figure 6:
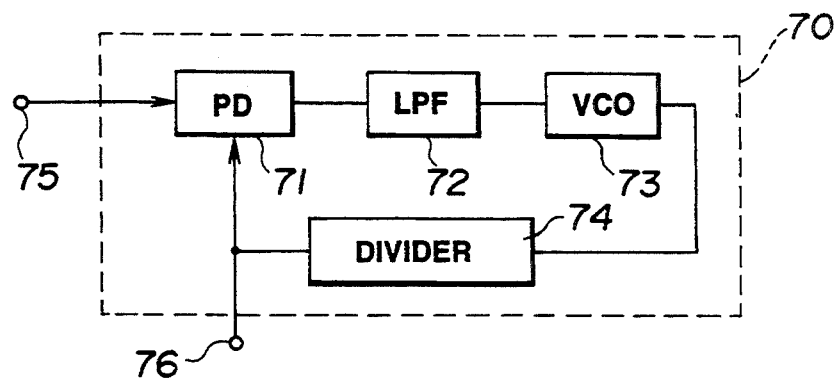
FIG. 6 is a block diagram showing a further modification of the 2TRCKPLL circuit 3.

The 2TRCKPLL circuit 32, controlling the frequency of the synchronization signals from outside to be within ±1% of the standard frequency, may be arranged as shown in FIG. 5, instead of in FIG. 2.

That is, if the 2TRCKPLL circuit 32 is arranged as shown in FIG. 5, the synchronization signals from the vertical/horizontal separating circuit 28 are routed via an input terminal 59 to a discrimination circuit 51 and a phase comparator 52.

The phase comparator 52 is separately fed from a divider 58 with the vertical synchronization signals which are produced by frequency division of the previously outputted vertical synchronization signals. The phase comparator 52 detects the phase error in the vertical synchronization signals, supplied via the input terminal 59, with respect to the vertical synchronization signals supplied from the divider 58. The resulting phase error signals are routed via a low-pass filter 54 to a voltage control led oscillator (VCO) 56 which has its oscillation frequency changed depending on the phase error signals. An output of the VCO 56 is routed to an input fixed contact 57b of a selector 57.

The input fixed contact 57a of the selector 57 is fed from a first oscillator 53 with the vertical synchronization signals having the frequency of ±1% with respect to the standard vertical synchronization signals, while the input fixed contact 57c of the selector 57 is fed from a second oscillator 55 with the vertical synchronization signals having the frequency of −1% with respect to the standard vertical synchronization signals.

The discrimination circuit 51 also detects by which percent the frequency of the vertical synchronization signals is offset from the vertical synchronization signals of the standard frequency. If the frequency offset is not more than ±1%, the discrimination circuit 51 controls the selector 57 to select the input fixed terminal 57b by the movable contact 57d. This causes the vertical synchronization signals from the VCO 56 to be supplied via the selector 57 to the divider 58.

If the frequency offset is not less than +1%, the discrimination circuit 51 controls the selector 57 to select the input fixed terminal 57a by the movable contact 57d. This causes the vertical synchronization signals from the first oscillator 53 with the frequency of +1% relative to the standard frequency to be supplied via the divider 57 to the pre-scaler 58.

If the frequency offset is −1% or less, the discrimination circuit 51 controls the selector 57 to select the input fixed terminal 57c by the movable contact 57d. This causes the vertical synchronization signals from the second oscillator 55 with the frequency of −1% relative to the standard frequency to be supplied via the selector 57 to the pre-scaler 58.

The pre-scaler 58 divides the frequency of the vertical synchronization signals supplied via the selector 57 for matching the timing in order to feed back the vertical synchronization signals to the phase comparator 52 and to simultaneously supply the vertical synchronization signals via an output terminal 60 to the DRCKPLL circuit 34 shown in FIG. 2.

In this manner, the frequency of the vertical synchronization signals supplied to the DRCKPLL circuit 34 may be controlled to be within ±1%, with the result that picture signals recorded on a given digital video tape recorder may be correctly reproduced by another digital video tape recorder, as in the previous embodiments.

The 2TRCKPLL circuit 32 may be configured as shown in FIG. 5.

In this case, the vertical synchronization signals from the vertical/horizontal separating circuit 28 are supplied via an input terminal 75 to a phase comparator 71, which is also fed with the vertical synchronization signals formed by frequency division of the previously outputted vertical synchronization signals. The phase comparator 71 detects the phase error of the vertical synchronization signals supplied via the input terminal 75 with respect to the vertical synchronization signals supplied from the divider 74. These phase error signals are supplied via a low-pass filter 72 to a VCO 73 the oscillation frequency of which is changed responsive to the phase error signals. The range of change of the oscillation frequency is such that the frequency of the vertical synchronization signals outputted from the divider 74 is comprised within ±1% with respect to the frequency of the standard vertical synchronization signals. The divider divides the frequency of the vertical synchronization signals from the VCO 73 and feeds back the resulting signals after timing matching. The divider also supplies the same resulting signals to the DRCKPLL circuit 34 shown in FIG. 2.

The VCO 73 of the 2TRCKPLL circuit 32 shown in FIG. 5 has its characteristics adjusted as described previously so that the frequency of the vertical synchronization signals supplied from the divider 74 to the DRCKPLL circuit 34 may be controlled to be within ±1% and hence the picture signals recorded by the digital video tape recorder may be correctly reproduced by a different digital video tape recorder of the same version.

Figure 7:
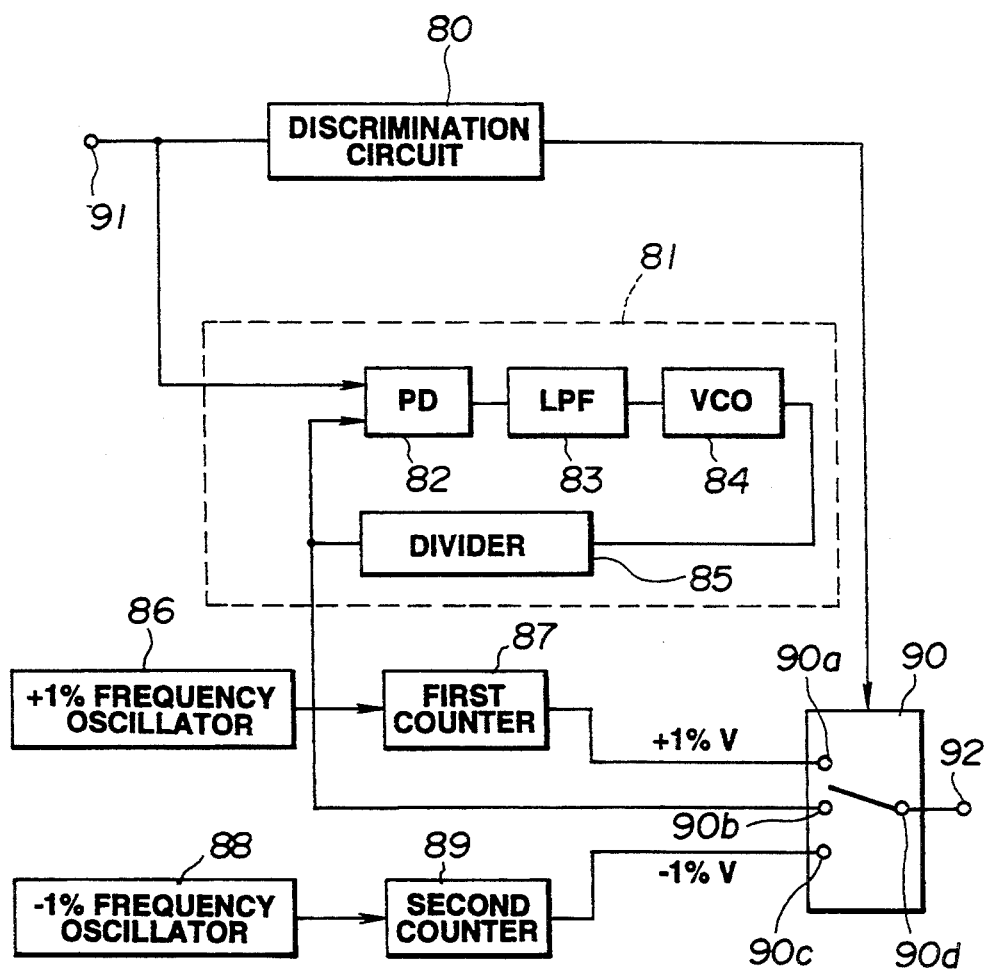
FIG. 7 is a block diagram showing a still further modification of the 2TRCKPLL circuit 3.

The 2TRCKPLL circuit 32 may also be configured as shown in FIG. 7.

In this case, the vertical synchronization signals from the vertical/horizontal separating circuit 28 are routed via an input terminal 91 to a decision circuit 80 and a phase comparator 82.

The phase comparator 82 is separately fed with the vertical synchronization signals from the divider 85. The phase comparator detects the phase error of the vertical synchronization signals supplied via the input terminal 91 with respect to the vertical synchronization signals from the divider 85 and transmits the phase error signals via a low-pass filter 83 to a VCO 84 which has its oscillation frequency changed in accordance with the phase error signals. The vertical synchronization signals of the frequency changed in this manner are routed to the divider 85.

The divider 85 divides the frequency of the vertical synchronization signals and feeds back the resulting signals after timing matching to the phase comparator 82 and to an input fixed contact 90b of a selector 90.

The vertical synchronization signals from the first oscillator 86, having the frequency of +1% with respect to the vertical synchronization signals of the standard frequency, are supplied to an input fixed contact 90a of the selector 90. The vertical synchronization signals from the second oscillator 88, having the frequency of −1% with respect to the vertical synchronization signals of the standard frequency, are supplied to an input fixed contact 90c of the selector 90.

The discrimination circuit 80 detects the frequency of the vertical synchronization signals supplied via the input terminal 91, and also detects by which percent the frequency of the vertical synchronization signals is offset from the vertical synchronization signals of the standard frequency. If the frequency offset is ±1%, the decision circuit 80 controls the selector 90 to select the input fixed terminal 90b by the movable contact 90d. This causes the vertical synchronization signals from the divider 85 with the frequency of ±1% relative to the vertical synchronization signals of the standard frequency to be supplied via the selector 90 and an output terminal 92 to the DRCKPLL circuit 34 shown in FIG. 2.

If the frequency offset is not less than +1%, the decision circuit 80 controls the selector 90 to select the input fixed terminal 90c by the movable contact 90d. This causes the vertical synchronization signals from the second counter 89 with the frequency of +1% relative to the vertical synchronization signals of the standard frequency to be supplied via the selector 90 and the output terminal 92 to the DRCKPLL circuit 34 shown in FIG. 2.

If the frequency offset is +1% or less, the decision circuit 80 controls the selector 90 to select the input fixed terminal 90c by the movable contact 90d. This causes the vertical synchronization signals from the second counter 89 with the frequency of −1% relative to the vertical synchronization signals of the standard frequency to be supplied via the selector 90 and the output terminal 92 to the DRCKPLL circuit 34 shown in FIG. 2.

In this manner, the frequency of the vertical synchronization signals supplied to the DRCKPLL circuit 34 may be controlled to be within ±1%, so that the picture signals recorded on the digital video tape recorder may be correctly reproduced by a different digital video tape recorder of the same version.

In the above description, the number of revolutions of the recording head 14 is controlled based upon the frequency of the vertical synchronization signals of the picture signals supplied from outside. However, it may also be control led based upon the frequency of the horizontal synchronization signals of the picture signals supplied from outside.

Also, in the above description, the recording/reproducing apparatus is a digital video tape recorder having the drum controlling function of controlling the number of revolutions of the recording head based upon the synchronization signals of the picture signals supplied from outside. However, it may also be a digital video tape recorder not having the drum controlling function.

Since the number of revolutions of the recording head is not controlled based upon the synchronization signals of the picture signals supplied from an outside source, the picture data recorded by a given digital video tape recorder can be correctly reproduced by different digital video tape recorders of the same version. In addition, since the frequency of the vertical synchronization signals is controlled by the 2TRCKPLL circuit 32 so as to be within ±1% of the frequency of the vertical synchronization signals, optimum vertical synchronization signals may be formed to give such effects as improved stabililty after phase capture of the DRCKPLL circuit 34 and the PBPLL circuit 36.

What is claimed is:

1. A recording and/or reproducing apparatus for digitally recording and/or reproducing picture information, comprising an input terminal for receiving picture signals having synchronization signals including vertical synchronization signals, a first converter coupled to said input terminal for performing matrix conversion and analog-to-digital conversion on the picture signals, a first memory for storing the converted signals from said first converter, a framing circuit for framing the stored converted signals from said memory, a recording/reproducing section including an encoder for encoding the framed signals from the framing circuit, recording means having a rotary head for recording the encoded signals from the encoder on a recording medium, reproducing means having said rotary head for reproducing the recorded signals from said recording medium, and a decoder for decoding the reproduced signals, a deframing circuit for restoring the decoded signals, a second memory for storing the deframed signals from said deframing circuit, a second converter for performing inverse matrix conversion and digital-to-analog conversion on the deframed signals from said second memory, correcting means supplied with the vertical synchronization signals of said picture signals for selectively correcting said vertical synchronization signals so that the frequency of said vertical synchronization signals is within a predetermined range offset from a reference synchronizing frequency, said correcting means comprising a discriminating circuit for discriminating the frequency of said vertical synchronization signals and a switch having an output for outputting first vertical synchronization signals having a frequency higher than said reference synchronizing frequency by a pre-set amount, for outputting second vertical synchronization signals having a frequency lower than said reference synchronizing frequency by a pre-set amount and for outputting third vertical synchronization signals corresponding to the vertical synchronization signals of said picture signals, said switch selectively outputting said first, second or third vertical synchronization signals depending on the results of the discrimination by said discrimination circuit, means coupled to the output of said switch for generating clock signals for controlling the number of revolutions per second of said rotary heads as a function of the selectively outputted synchronization signals, and means for supplying the generated clock signals to said recording/reproducing section.

2. The recording and/or reproducing apparatus as claimed in claim 1, wherein said correcting means further includes a phase comparator and a frequency divider for dividing the frequency of the output of said switch, the phase comparator comparing the phase of the synchronization signals applied to the correcting means and outputting the results of the comparison as said third vertical synchronization signals.

3. The recording and/or reproducing apparatus as claimed in claim 2, further comprising a low-pass filter and a VCO coupled to the output of the phase comparator.

4. A recording and/or reproducing apparatus for digitally recording and/or reproducing picture information, comprising an input terminal for receiving picture signals having synchronization signals, a first converter coupled to said input terminal for performing matrix conversion and analog-to-digital conversion on the picture signals, a first memory for storing the converted signals from said first converter, a framing circuit for framing the stored converted signals from said memory, a recording/reproducing section including an encoder for encoding the framed signals from the framing circuit, recording means having a rotary head for recording the encoded signals from the encoder on a recording medium, reproducing means having said rotary head for reproducing the recorded signals from said recording medium, and a decoder for decoding the reproduced signals, a deframing circuit for restoring the decoded signals, a second memory for storing the deframed signals from said deframing circuit, a second converter for performing inverse matrix conversion and digital-to-analog conversion on the deframed signals from said second memory, correcting means supplied with the synchronization signals of said picture signals for selectively correcting said synchronization signals so that the frequency of said synchronization signals is within a predetermined range offset from a reference synchronizing frequency, said predetermined range of offset being approximately 1 percent, said correcting means operable to selectively output the synchronization signals of said picture signals if said last mentioned synchronization signals are within said predetermined range or synchronization signals of a frequency offset from said reference synchronizing frequency by 1% if the synchronization signals of said picture signals are outside said predetermined range, means coupled to said correcting means for generating clock signals for controlling the number of revolutions per second of said rotary head based on the selectively outputted synchronization signals, and means for supplying the generated clock signals to said recording/reproducing section.

* * * * *